United States Patent [19]

Snead

[11] 3,942,625

[45] Mar. 9, 1976

[54] PORTABLE CONVEYOR LOAD MEASURING APPARATUS

[76] Inventor: Edwin DeS. Snead, Box 798, Georgetown, Tex. 78626

[22] Filed: Sept. 13, 1974

[21] Appl. No.: 505,940

[52] U.S. Cl. ...................... 198/37; 198/39; 177/16
[51] Int. Cl.² .......................................... B65G 43/08
[58] Field of Search ................. 198/39, 37; 222/55; 177/16

[56] References Cited
UNITED STATES PATENTS

| | | | |
|---|---|---|---|
| 1,125,705 | 1/1915 | Messiter............................... | 198/37 |
| 3,333,649 | 8/1967 | Schafsteller.......................... | 177/16 |
| 3,561,643 | 2/1971 | Klouen................................. | 222/55 |
| 3,722,660 | 3/1973 | Des Snead........................... | 198/39 |

Primary Examiner—Robert J. Spar
Assistant Examiner—James M. Slattery
Attorney, Agent, or Firm—Peter J. Murphy

[57] ABSTRACT

For measuring the load output of a lifting conveyor powered by a three-phase motor, electric measuring apparatus is coupled to the motor power supply conductors by voltage take-off leads and current transformers. Voltage and current, proportional respectively to motor supply voltage and current, are fed to a solid state watt transducer, which produces a millivolt output proportional to the total power consumption of the motor. The transducer output signal is fed to a solid state transmitter, which amplifies the signal, and which includes a zero output adjustment for producing a zero output for a selected input proportional to the motor load driving an unloaded conveyor. The transmitter output is fed to a solid state integrator through an intervening potentiometer which is adjusted to calibrate the apparatus to the length and lift of the conveyor. The integrator produces voltage pulses representative of a selected ton fraction, and it triggers a counter which records cumulative tonnage conveyed.

In alternative form the apparatus includes a nonlinear amplifier which modifies the transducer output signal to compensate for the nonlinear relationship between mechanical power output and electrical power input of the motor.

13 Claims, 5 Drawing Figures

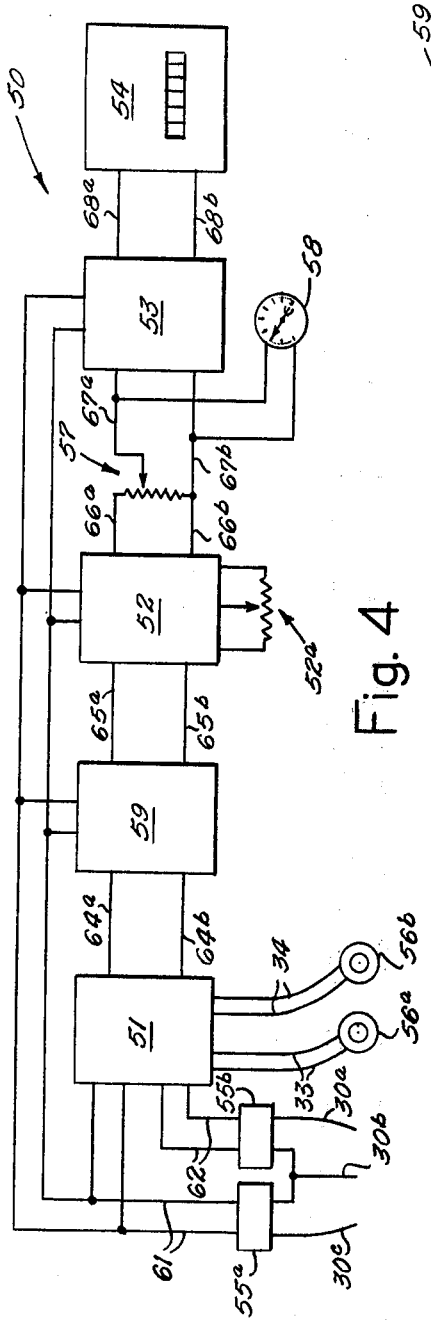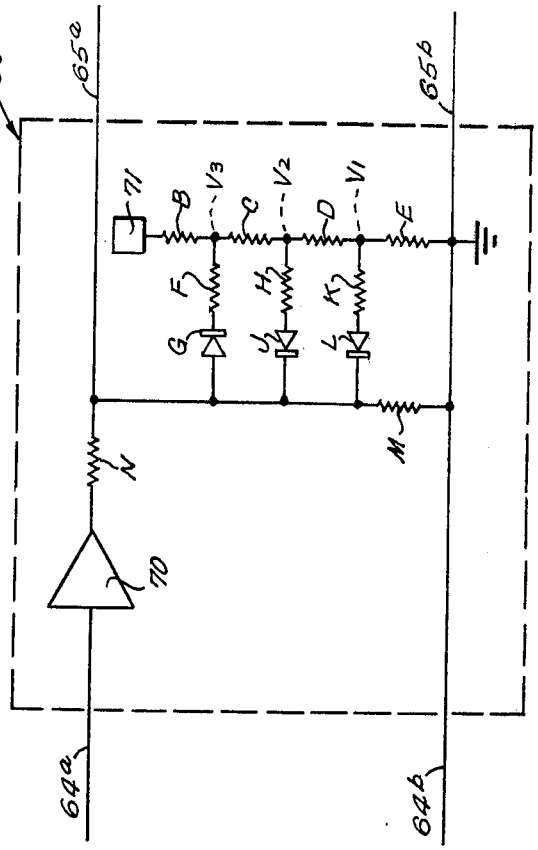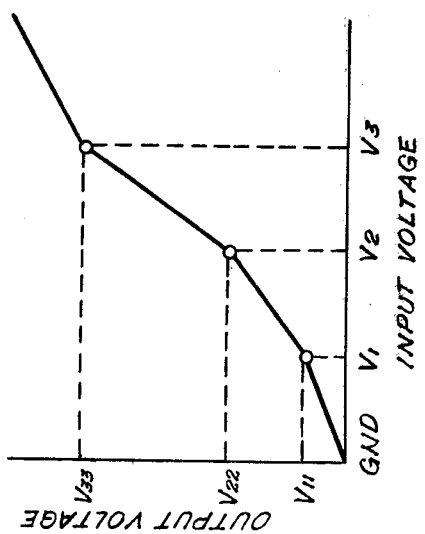
Fig. 4
Fig. 5
Fig. 3

PORTABLE CONVEYOR LOAD MEASURING APPARATUS

BACKGROUND AND SUMMARY OF THE INVENTION

This invention relates to apparatus adapted to be quickly connected to electric motor driven lifting conveyors and which can be quickly adjusted to measure and indicate immediately the load delivered by the conveyor. More particularly, the invention relates to apparatus which is compact, light weight, and readily portable for use with a multiplicity of conveyors.

Apparatus for measuring the tonnage carried by lifting conveyors is known; and one form of such apparatus is described in applicant's U.S. Pat. No. 3,722,660 issued Mar. 27, 1973. The apparatus disclosed in that patent is inherently bulky and cumbersome, not adapted to be readily connected to and disconnected from the conveyor, and therefore limited for use on permanent installations, or for use where the measuring apparatus is to remain connected to the conveyor for an extended period such as several days.

It is desirable that portable measuring apparatus be available for use in a large plant, such as quarrying operation, or in any other plant wherein a multiplicity of conveyors or conveyor systems are employed for the handling of bulk materials and where it is necessary to ascertain and record the load output from such conveyors. In situations where it is required to record the entire load output for the conveyors, but where only certain of the conveyors are being operated at any given time, with the use of portable measuring apparatus, a lesser number of such apparatus may be employed for ready connection to the several systems in use when they are used. This will obviate the necessity for having a separate measuring apparatus for each conveyor. In a situation where it is not necessary to fully measure the output of each conveyor, but only to monitor occasionally the output of a conveyor, it will be apparent that the expense of measuring systems can be minimized with the use of portable measuring apparatus which is readily connectable to a plurality of conveyors.

A principal object of this invention is to provide measuring apparatus adapted for use in monitoring a plurality of conveyors, and therefore adapted for quick connection to and disconnection from such conveyors and for quick calibration to the particular conveyor with minimum interference with the operation of the conveyor.

Another principal object of this invention is to provide such weighing apparatus in a compact and light weight package which can be readily and manually carried from one conveyor system site to another by a single operator.

Another object of this invention is to provide such apparatus which is very reliable and accurate.

A further object of this invention is to provide such conveyor measuring apparatus which is all electric and which has no moving parts.

These objects are accomplished in electric measuring apparatus for use with a lifting conveyor driven by an electric motor, which includes a solid state watt transducer, and means for coupling the transducer to the motor power supply conductors include means for feeding input voltage to the watt transducer proportional to the motor supply voltage and means for feeding an input current to the watt transducer proportional to the current drawn by the motor, whereby the watt transducer produces an output voltage proportional to the motor power consumption. A solid state transmitter coupled to the output of the transducer amplifies the transducer output voltage, and includes adjustment means for producing a zero output signal responsive to an input voltage of preselected value, and therefore produces an output signal proportional to the motor power consumption in excess of a selected power consumption. A solid state integrator is coupled to the transmitter for converting the transmitter output signal to voltage pulses of uniform value; and adjustment means coupled between the transmitter and the integrator adjust the value of the input voltage to the integrator. A counter coupled to the integrator output detects and records cumulatively the integrator output pulses.

The novel features and advantages of the invention as well as additional objects thereof will be understood more fully from the following description when read in connection with the accompanying drawings.

DRAWINGS

FIG. 3 is a diagram of a linear approximation of an efficiency curve for a conveyor motor;

FIG. 4 is a diagrammatic and schematic circuit diagram for an alternative form of electric measuring apparatus according to the invention; and FIG. 5 is a schematic circuit diagram illustrating a nonlinear amplifier for the apparatus of FIG. 4.

DESCRIPTION OF THE EMBODIMENT OF FIGS. 1 AND 2

Figure 1:
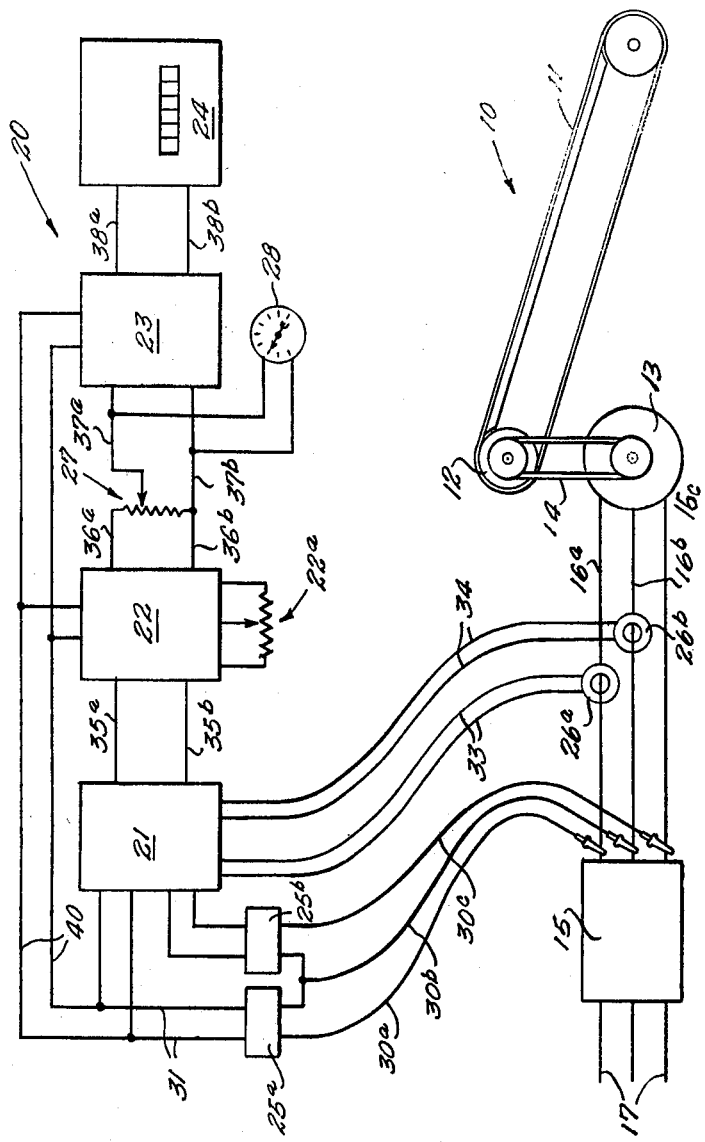
FIG. 1 is a diagrammatic and schematic circuit diagram of one form of electric measuring apparatus according to the invention, coupled to a conveyor system.

Referring to FIG. 1, there is included a diagrammatic representation of a conveyor apparatus or system. In the following specification, the term "conveyor" is used to designate a conveyor apparatus or conveyor system which may include a sequence of units or components for moving material from one point to another, and including a lift station at some point in the system.

The conveyor 10, illustrated diagrammatically in FIG. 1, represents a lift station and includes an endless conveyor belt 11 on suitable rollers and driven by a drive pulley 12. The drive pulley is driven by a suitable electric drive motor 13, such as a 480 volt three-phase motor, through a suitable transmission illustrated as belt 14. The motor control includes a motor starter 15 connected to /the motor by conductor lines 16a, 16b and 16c, with the starter being supplied from a 480 volt supply source through power lines 17.

While the illustrated conveyor system is an endless belt system, it should be understood that the term conveyor is intended to include other types of systems such as bucket systems, liquid slurry systems and pneumatic systems. Also the term conveyor is intended to include a lowering conveyor, as well as a lifting conveyor.

A preferred form of measuring apparatus 20 according to the invention, as illustrated in FIG. 1, consists of the following solid state components with associated accessories and connecting conductors, all of which may be conveniently packaged in a carrying case with the total weight being only 45 lbs. for example.

The principal components of the apparatus are a watt transducer 21, a transmitter 22, an integrator 23 and a counter 24. Accessory components are voltage transformers 25a and 25b, current transformers 26a and 26b, a calibrating potentiometer 27, and a volt meter 28.

The volt meter 28, as will be explained, provides a continuous reading which is proportional to the tons per hour delivered by the conveyor, and is calibrated to provide a visual ton per hour reading. The counter 24 provides a reading of tonnage delivered for any selected period.

Referring to the drawing, the watt transducer 21 may be transducer model WT3-1K5 manufactured by Scientific Columbus, 1035 West Third Ave., Columbus, Ohio 43212. Incorporated herein by reference is a brochure of Scientific Columbus describing this transducer, identified as follows: (1) Form 01173(5M), referring to Halltiplier Power Transducers/Converters (four pages); and (2) Halltiplier Watt Transducers/WT3-1K5 Series, three phase, three wire, two element (single page). Voltage inputs to this watt transducer are supplied from voltage transformers 25a and 25b, with the transformers being connected to the motor lines 16a, 16b, and 16c by means of leads 30a, 30b and 30c respectively; and each of these leads may be provided with alligator-type clips for conveniently attaching these leads to line terminals or any exposed portion of the motor lines. As seen in the drawing the leads 30a and 30b are connected to the primary of transformer 25a, and leads 30b and 30c are connected to the primary of transformer 25b. These transformers provide a 4 to 1 voltage reduction so that secondary voltages of 120 volts AC are fed to the watt transducer through conductors 31 and 32.

The current inputs for the watt transducer are provided by the current transformers 26a and 26b coupled to the watt transducer by respective leads 33 and 34. These current sensing transformers may be split-core transformers fitted with hinges and clamps so that they can be quickly placed around the lead wires to the motor without unhooking the wires. The watt transducer produces a 0 to 100 millivolt output which is proportional to the total electrical power input to the motor 13.

This transducer output voltage is fed, by means of conductors 35a and 35b, to the transmitter 22 which functions to amplify the voltage and to provide an output adjustment which allows the operator to set the transmitter output signal at zero for a selected electrical power input to the motor 13. This selected input will be the power input when the conveyor is running unloaded, so that the transmitter output signal will then be directly proportional to the increase in power input demanded by the conveyor load, and which would be directly proportional to that conveyor load. The zero adjustment is provided by a zero adjusting potentiometer 22a which is a normal part of the transmitter circuitry, but which is repositioned for ready adjustment by the operator in order to calibrate the measuring apparatus to the particular conveyor. A suitable transmitter for this purpose is transmitter Model 821-BX-U manufactured by Acromag Incorporated, 30765 Wixom Road, Wixom, Mich. 48096. The output signal from this transmitter is a voltage signal in the range of 1 to 5 volts at 4 to 20 milliamps; and this signal is fed to the calibrating potentiometer through conductors 36a and 36b. Incorporated herein by reference is a brochure of Acromag Incorporated describing series 800 Transmitters and identified as: "1-012. O Catalog: Sectional; Revised: Sept. 1972 (4 pages)".

Figure 2:
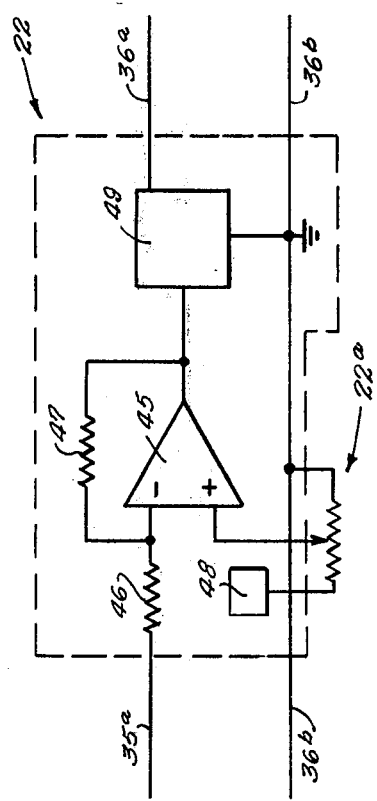
FIG. 2 is a schematic circuit diagram illustrating the transmitter circuit for the apparatus of FIG. 1.

FIG. 2 is a schematic circuit diagram of a portion of the circuitry for the transmitter 22, shown in broken lines, and further illustrating the function of the zero adjustment potentiometer 22a. Referring to FIG. 2 the transmitter circuitry includes a differential amplifier 45, and associated input resistor 46 and feedback resistor 47. An internal power supply 48 supplies a positive reference voltage for biasing the amplifier through the zero adjustment potentiometer 22a. The amplifier output voltage is fed to a voltage-to-current transducer 49; and the transmitter output signal then is a current signal which is fed to the calibrating potentiometer 27 through conductors 36a and 36b.

The voltage applied to the plus terminal of amplifier 45 is normally used in circuits of this type to provide a zero output when the input voltage applied through conductors 35a and 35b is zero. However, in this application the bias voltage applied to the positive input of the amplifier is intentionally increased so that the output of the amplifier is zero when the input voltage from conductors 35a and 35b is that generated by the belt running without any load. The feedback resistor and input resistor determine the gain of the amplifier with respect to deviations from this biased zero value. Thus the output of amplifier 45 is directly proportional to the increased power consumption of the conveyor motor 13 over its consumption when moving no material. Transducer 49 produces a constant current into conductors 36a and 36b which is proportional to the voltage which it receives from amplifier 45. This current is impressed upon calibrating potentiometer 27, producing a voltage across that potentiometer which is proportional to the output of amplifier 45.

The calibrating potentiometer 27 is provided for the purpose of calibrating the measuring apparatus 20 to the length and lift of the conveyor as will be explained subsequently. The output voltage signal from this potentiometer is fed by means of conductors 37a and 37b to the integrator 23, such as Integrator Model 205-LX-1 manufactured by Acormag Incorporated of Wixom, Mich. Incorporated herein by reference is a brochure of Acromag Incorporated describing Series 200 Electronic Integrators and identified as: "4-004.1 Catalog: Section 4; Revised Aug. 1972 (four pages)."

The output signal from the calibrating potentiometer is a continuous voltage signal proportional to the weight of material transferred on the conveyor belt 11; and this voltage is indicated at the volt meter 28 connected across the conductors 37a and 37b. The volt meter dial may be calibrated to read in terms of tons per hour. Accordingly the volt meter 28 always provides an instantaneous reading of the rate of material delivered per hour. This signal is fed to integrator 23 through conductors 37a and 37b, and is converted by the integrator into 24 volt DC output pulses. The apparatus is calibrated so that each such output pulse corresponds to a unit of weight of material transported by the conveyor belt 11, such as 200 pounds or 1/10 ton.

The output of integrator 23 is fed by conductors 38a, 38b to the counter 24, which counts the pulses and therefore records the cumulative tonnage transported over a delivery period. The counter is a commercially available unit.

Power is supplied to the transmitter 22 and the integrator 23 from a 120 volt AC power supply, which is the secondary of transformer 25a, through conductors 40.

As indicated, the above described watt transducer 21, transmitter 22 and integrator 23 are solid state units which are commercially available; and which are connected together and with other components in the manner described to produce a unique measuring apparatus. Descriptions of certain of these component units are incorporated herein by reference.

DESCRIPTION OF THE EMBODIMENT OF FIGS. 4 AND 5

Although this apparatus measures the electric energy supplied to the motor, the actual quantity of interest is the power output from the motor because it is the power output which is directly related to the amount of material transported. Electric motors have an undesirable characteristic that the efficiency of energy conversion from electrical to mechanical is varying with the loading on the motor. This characteristic can be compensated for by introducing a nonlinear diode-function-generator amplifier to the circuit, to convert the voltage signal representing the input power to a voltage signal which represents the output power of the motor.

FIG. 3 of the drawing is an approximation of an efficiency curve for a typical electric motor used in this apparatus, in which the input voltage is plotted against an output voltage which represents the actual mechanical output power of the motor. In this figure, the efficiency curve is approximated by four linear segments which are separated by input voltage points V1, V2 and V3; and these voltage points, V1, V2 and V3 represent values of the voltage output signal from the watt transducer.

FIG. 4 is a diagrammatic circuit representation of a modified form of measuring apparatus 50 according to the invention, capable of being connected to the described conveyor 10 by means of voltage lead conductors 30a, 30b, 30c and conductors 33 and 34 connected to current transformers 56a and 56b. This apparatus is similar to the apparatus 20 except that it includes a nonlinear amplifier, the principal components including a watts transducer 51, a nonlinear amplifier 59, a transmitter 52, an integrator 53 and a counter 54. Accessory components are voltage transformers 55a and 55b, current transformers 56a and 56b, a calibrating potentiometer 57, and a volt meter 58.

Current proportional to the motor supply current is fed to the watt transducer 51 through the conductors 33 and 34; and voltage proportional to the motor supply voltage is fed to the watt transducer from transformers 55a and 55b through respective conductors 61 and 62. The transducer output signal is fed to the nonlinear amplifier 59 through conductors 64a and 64b; and the operation of this amplifier will be described subsequently in connection with FIG. 5. The amplifier output signal is fed through conductors 65a and 65b to the transmitter 52 which will function in the manner previously described to provide a zero adjustment through the adjustment potentiometer 52a. The transmitter output signal is fed through conductors 66a and 66b to the calibrating potentiometers 57, and its output signal is fed by means of conductors 67a and 67b to the volt meter 58 and to the integrator 53. The integrator output pulses are then fed to the counter 54 through conductors 68a and 68b.

FIG. 5 is a schematic diagram for the diode-function-generator amplifier 59. The input voltage is applied to an amplifier 70 to provide isolation between the input and the output of the amplifier 59. Resistors B, C, D and E provide a set of reference voltages which correspond to the break points, V1, V2 and V3 of the curve (FIG. 3), which we wish to approximate, with a positive reference voltage being supplied from an internal power supply 71. Resistors F, H, K, M and N provide a resistive voltage-divider whose gain ratio varies with the voltage supplied from amplifier 70.

When the circuit output voltage appearing across conductors 65a and 65b is less than the value V1, diodes J and L are conducting and the divider network is comprised of resistors H, K, M and N. As the output voltage increases beyond the value V1, diode L stops conducting thus removing resistor K from the network, and the gain of the amplifier increases. As the output voltage increases beyond the value V2, diode J will also stop conducting, and the maximum gain of the amplifier will be attained which is determined by the resistors M and N only. As the output voltage increases further beyond the value V3, diode G will begin conducting thereby introducing resistor F into the network and decreasing the gain of the amplifier.

It will be seen then with reference to FIG. 3 that for the condition where the conveyor motor is running at a low percentage of load and at relatively poor efficiency, the gain of the amplifier 70 will be reduced so that the recorded output signal will be less than would be recorded were it directly proportional to the input energy to the motor, to reflect this reduced efficiency. When the motor efficiency increases to a maximum, when it is operating in a range near 100 percent load for example, the amplifier gain will be a maximum to reflect this condition. Again when the motor is substantially overloaded, as represented by the area of the curve beyond the value V3, the amplifier gain is again reduced to reflect reduced efficiency. With a nonlinear amplifier of this type included in the system, the accuracy of the apparatus can be maintained in the range of 95 percent to 98 percent over the full load range of the conveyor motor.

OPERATION

For calibrating the above described measuring apparatus to a particular conveyor 10, the apparatus is coupled to the conveyor by coupling the two current transformers 26a and 26b to appropriate conductor lines such as the lines 16a and 16b, and by connecting the alligator clips of the lead lines 30a, 30b and 30c to appropriate connector points in the lines 16a, 16b and 16 respectively. The conveyor is first run unloaded so that the transducer 21 output voltage will be proportional to the motor power consumption for driving the conveyor unloaded; and the transmitter zero adjustment 22a is then adjusted to produce a zero output at the transmitter 22, and this will be apparent from a zero reading on the volt meter or load rate indicator 28. This setting of potentiometer 22a may be noted and recorded and becomes the "no-load factor" for the conveyor.

The conveyor is then run in loaded condition to deliver a measured weight of material; and the reading of counter 24 compared with the actual weight. If the counter reading does not correspond with the actual weight, the input voltage to the integrator is adjusted by means of the potentiometer 22, as desired, and the necessary further calibrating runs of the conveyor made until the counter reading for tons delivered corresponds exactly with the actual weight of material delivered. When this calibration has been completed, the dial setting for the potentiometer 27 is noted and recorded; and this becomes the "lift factor" of the particular conveyor. The apparatus is now calibrated for the length and lift of the conveyor. With the apparatus set for both the proper no-load factor and lift factor, both the rate recorder 28 and the counter 24 will provide accurate indications of the actual weight of material conveyed; and the accuracy for this system has been found to be in the range of 95 percent to 98 percent.

Once the lift factor for a particular conveyor is ascertained and recorded for future reference, the operator of the measuring apparatus 20 may check periodically the load output for this conveyor by quickly coupling the apparatus to the conveyor as described, dialing in the previously determined lift factor, dialing in the previously determined no-load factor, and obtain instantaneous readings of tons per hour being conveyed and also load delivered over a selected period. The measuring apparatus may be connected to the conveyor system while it is operating and without interfering with the conveying operation. If it is desired to provide for greater accuracy, the no-load factor may be checked by running the conveyor unloaded just for a sufficient time to reset the zero load adjustment 22a as previously described.

Should it be desirable or necessary to ascertain the performance of a conveyor for which the apparatus has not been calibrated previously, the apparatus may be connected to the conveyor in the described manner, the potentiometer 27 may be set for an estimated lift factor, and the conveyor may be run momentarily in unloaded condition to adjust the transmitter for zero load. The indications for load rate and tons delivered may then be noted and recorded; and at a later time when it is convenient to calibrate the measuring apparatus in relation to this particular conveyor. The correct lift factor may be ascertained and compared with the estimated lift factor; and the recorded readings may be corrected accordingly.

The calibration and operation of the measuring apparatus 50 is substantially identical.

It will be apparent, then, that for a plant having a number of conveyors or conveyor systems all of which have been previously calibrated, a single operator with a single measuring apparatus as above described could measure the output of a large significant number of conveyors in a single work day.

What has been described is a novel measuring apparatus which is portable, readily connected to and disconnected from conveyors, and therefore adapted for use by a single operator for measuring the output of a plurality of conveyors in a very short time period. Since the apparatus is all electric, composed of solid state components, and has no moving parts, it lends itself to portability, reliability, accuracy, and versatility in use.

While the apparatus has been described for use with a three-phase power system, it will be apparent that the apparatus according to the invention may be coupled, as well, to a single-phase power system.

While the apparatus has been described for use in connection with a continuous belt type conveyor, it will be apparent that it could be connected in the same manner to a bucket-type conveyor. It will further be apparent that this measuring apparatus is adapted for use in measuring loads delivered by a pneumatic conveyor system, for which it may be connected to the blower motor and calibrated for the no-load factor when the system is operated unloaded, and calibrated for the lift factor with the system delivering premeasured amounts of material in a similar manner. By the same token, the apparatus may be used for measuring loads delivered by a slurry type conveying system wherein solid materials are conveyed in a liquid, with the measuring apparatus being connected to the pump driving motor and calibrated in a manner similar to that described for the pneumatic conveyor system.

While a preferred embodiment of the invention has been illustrated and described, it will be understood by those skilled in the art that changes and modifications may be resorted to without departing from the spirit and scope of the invention.

What is claimed is:

1. Electric measuring apparatus for use with a lifting conveyor driven by an electric motor comprising a solid state watt transducer; means for coupling said watt transducer to the power supply conductors of said motor, including means for feeding an input voltage to said watt transducer proportional to the motor supply voltage, and means for feeding an input current to said watt transducer proportional to the current drawn by said motor; said watt transducer producing an output voltage proportional to the motor power consumption;

a solid state transmitter coupled to the output of said watt transducer for amplifying the transducer output voltage; said transmitter including adjustment means for producing a zero output signal responsive to an input voltage of preselected value; said transmitter producing an output voltage proportional to the motor power consumption in excess of a selected power consumption to which the adjusted zero output voltage is responsive;

a solid state integrator coupled to said transmitter, for converting the transmitter output signal to voltage pulses of uniform value; adjustment means coupled between said transmitter and said integrator for adjusting the value of the input voltage to said integrator;

and counter means coupled to the output of said integrator for detecting and recording cumulatively the integrator output pulses.

2. Apparatus as set forth in claim 1
   said means for feeding input current to said watt transducer including current transformers for coupling to the motor power supply conductors.

3. Apparatus as set forth in claim 1
   said means for feeding an input voltage to said watt transducers including a potential transformer, and leads provided with spring clips for ready attachment to motor power supply conductors.

4. Apparatus as set forth in claim 1
   a voltmeter connected to the output of said transmitter for detecting and indicating the output voltage; said voltmeter providing means for determining the zero voltage output of said transmitter for the preselected input voltage; and said voltemeter providing a visual indication of the output voltage which voltmeter proportional to said excess power consumption.

5. Apparatus as set forth in claim 1
   said transmitter adjustment means comprising a solid state differential amplifier, and means including a source of positive reference voltage and a potentiometer connected in series therewith for selectively biasing said differential amplifier to produce the zero output.

6. Apparatus as set forth in claim 1
wherein said conveyor motor is a three-phase motor supplied by first, second and third power conductors;
said means for feeding input voltage to said watt transducer including first and second potential transformers, said first transformer being connected across said first and second power conductors, and said second transformer being connected across said second and third power conductors;
said means for feeding input current to said watt transducer comprising first and second current transformers each coupled to a separate one of said motor power conductors.

7. Apparatus as set forth in claim 6
conductor means coupled to the output of one of said potential transformers, for supplying power to said transmitter and to said integrator.

8. Apparatus as set forth in claim 1
nonlinear amplifier means coupled to said transmitter including means for varying the amplifier gain in response to incremental increases in the value of the amplified signal.

9. Apparatus as set forth in claim 1
nonlinear amplifier means coupled to said transmitter for amplifying the transmitter output signal; said nonlinear amplifier means comprising a solid state amplifier, and a diode-function-generator in a voltage divider network connected to the output of said amplifier for varying the gain of said amplifier in incremental steps corresponding to increased value of the amplified voltage signal.

10. A method for measuring a load conveyed on a lifting conveyor powered by an electric motor, including the steps
sensing the voltage of the conveyor motor power supply;
sensing the current drawn by the conveyor motor;
feeding to a watt transducer an input voltage proportional to the motor supply voltage, and feeding to the watt transducer an input current proportional to the current drawn by said motor, to produce from said watt transducer an output signal proportional to the motor power consumption and to the power delivered by said motor;
shifting the value of said output signal to zero for a preselected value of motor power consumption;
integrating the shifted ouput signal to produce voltage pulses of uniform value which are proportional to incremental units of motor power consumption in excess of said preselected value of power consumption;
and counting said pulses to accumulate the load conveyed.

11. A method as set forth in claim 10
including adjusting the value of the shifted output signal prior to integration, in relation to actual measured output of the conveyor.

12. A method as set forth in claim 10
including detecting the shifted output voltage prior to integration, as an indication of the rate of excess power consumption.

13. A method as set forth in claim 10
including amplifying said output signal prior to integration by means of a nonlinear amplifier, the gain of which varies as a function of the ratio of motor power output to motor power input over the load range of the motor.

* * * * *